United States Patent
Keller (10) Patent No.: US 9,732,884 B1
(45) Date of Patent: Aug. 15, 2017

(54) POLYMER LOCKING SPACER SYSTEM

(71) Applicant: Gerard Keller, New Orleans, LA (US)

(72) Inventor: Gerard Keller, New Orleans, LA (US)

( * ) Notice: Subject to any disclaimer, the term of this patent is extended or adjusted under 35 U.S.C. 154(b) by 0 days.

(21) Appl. No.: 14/488,034

(22) Filed: Sep. 16, 2014

Related U.S. Application Data (60) Provisional application No. 61/878,222, filed on Sep. 16, 2013, provisional application No. 62/025,851, filed on Jul. 17, 2014.

(51) Int. Cl.
*F16L 3/223* (2006.01)

(52) U.S. Cl.
CPC ............ *F16L 3/2235* (2013.01); *F16L 3/223* (2013.01)

(58) Field of Classification Search
CPC ....... F16L 3/00; F16L 3/02; F16L 3/08; F16L 3/22; F16L 3/221; F16L 3/222; F16L 3/223; F16L 3/2235; F16L 3/227
USPC ...... 248/49, 52, 56, 65, 68.1, 73, 74.1, 74.4, 248/226.11, 230.1
See application file for complete search history.

(56) References Cited

U.S. PATENT DOCUMENTS

| | | | | |
|---|---|---|---|---|
| 2,396,836 A | * | 3/1946 | Ellinwood | F16L 3/2235 174/135 |
| 3,024,301 A | * | 3/1962 | Walch | H02G 3/0443 174/101 |
| 3,650,547 A | | 3/1972 | Tickett | |
| 3,783,907 A | | 1/1974 | Skinner | |
| 3,791,416 A | | 2/1974 | Ziemek et al. | |
| 3,896,771 A | | 7/1975 | Chayes et al. | |
| 4,395,009 A | * | 7/1983 | Bormke | F16L 3/227 174/157 |
| 4,643,379 A | * | 2/1987 | Potocnik | H02B 1/202 248/49 |
| 4,858,861 A | | 8/1989 | Wilkinson, III | |
| 5,184,794 A | * | 2/1993 | Saito | F16L 3/13 248/316.5 |
| 5,224,674 A | * | 7/1993 | Simons | A61M 5/1418 248/68.1 |
| 5,246,189 A | * | 9/1993 | Compton | F16L 3/01 248/52 |
| 5,458,438 A | | 10/1995 | Wyke et al. | |
| 5,464,179 A | | 11/1995 | Ruckwardt | |
| 6,019,322 A | * | 2/2000 | Shimizu | H02G 1/06 174/158 R |
| 6,152,087 A | | 11/2000 | Shibata et al. | |
| 6,241,198 B1 | | 6/2001 | Maruyama | |
| 6,273,030 B1 | | 8/2001 | Harth, III | |
| 6,308,921 B1 | * | 10/2001 | Borzucki | F16L 3/237 248/68.1 |
| 6,325,336 B1 | | 12/2001 | Coykendall | |
| 6,528,728 B1 | * | 3/2003 | Shima | H02G 3/0437 174/101 |

(Continued)

*Primary Examiner* — Stanton L Krycinski
*Assistant Examiner* — Guang H Guan
(74) *Attorney, Agent, or Firm* — Garvey, Smith & Nehrbass, Patent Attorneys, L.L.C.; Charles C. Garvey, Jr.; Seth M. Nehrbass (57) ABSTRACT

Improvements for tube separation assemblies currently used in oil field applications include tube assemblies for maintaining tube separation using a fastening system comprising preferably non-metallic tube spacers and a preferably locking mechanism on the fastening system. The present invention allows all parts of the system to be more easily visually inspected than prior systems known to the inventor.

15 Claims, 10 Drawing Sheets

(56) References Cited

U.S. PATENT DOCUMENTS

| | | | |
|---|---|---|---|
| 6,580,867 B2* | 6/2003 | Galaj | G02B 6/4459 |
| | | | 174/117 F |
| 6,883,761 B2 | 4/2005 | Boon et al. | |
| 6,888,067 B1* | 5/2005 | Howland | H01R 13/5208 |
| | | | 174/74 R |
| 7,008,686 B1* | 3/2006 | Rogers | F16F 1/025 |
| | | | 248/633 |
| 7,011,277 B2 | 3/2006 | Mizukoshi et al. | |
| 7,051,983 B2* | 5/2006 | Sirignano | H02G 3/32 |
| | | | 248/68.1 |
| 7,066,036 B2* | 6/2006 | Ochovo | B66B 1/3484 |
| | | | 73/862.472 |
| 7,223,052 B1* | 5/2007 | Evans | F16L 1/10 |
| | | | 248/216.1 |
| 7,514,630 B2* | 4/2009 | Anderson | H02G 3/30 |
| | | | 174/135 |
| 7,654,587 B2 | 2/2010 | Gibb et al. | |
| 7,694,918 B2* | 4/2010 | Zhang | B30B 15/00 |
| | | | 248/231.9 |
| 8,096,562 B2* | 1/2012 | Johansson | F16L 5/08 |
| | | | 174/40 CC |
| 8,281,527 B2 | 10/2012 | Baratuci et al. | |
| 8,398,034 B2 | 3/2013 | Lambert et al. | |
| 8,519,275 B2* | 8/2013 | Hashimoto | G06F 1/183 |
| | | | 174/480 |
| 8,662,456 B2* | 3/2014 | Komiya | H02G 11/006 |
| | | | 174/72 R |
| 8,757,560 B2* | 6/2014 | Darnell | H02G 3/0456 |
| | | | 174/68.1 |
| 9,038,968 B2* | 5/2015 | Hennon | F16L 3/1091 |
| | | | 248/65 |
| 2006/0032655 A1* | 2/2006 | Sirignano | H02G 3/32 |
| | | | 174/58 |
| 2006/0169344 A1 | 8/2006 | Toole | |
| 2006/0249636 A1* | 11/2006 | Thiedig | F16L 3/1091 |
| | | | 248/74.4 |
| 2009/0218451 A1* | 9/2009 | Lundborg | F16L 5/02 |
| | | | 248/56 |
| 2012/0006947 A1* | 1/2012 | Gundel | H02G 3/30 |
| | | | 248/68.1 |

* cited by examiner

POLYMER LOCKING SPACER SYSTEM

CROSS-REFERENCE TO RELATED APPLICATIONS

Priority of U.S. Provisional Patent Application Ser. No. 61/878,222, filed Sep. 16, 2013, and U.S. Provisional Patent Application Ser. No. 62/025,851, filed Jul. 17, 2014, both of which are incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fastening systems.

2. General Background of the Invention

Patents have issued which are directed to tube support arrangements. The following table lists some examples.

TABLE 1

| Pat. No. | Title | Issue Date |
|---|---|---|
| 3,650,547 | Pipe Fitting | Mar. 21, 1972 |
| 3,783,907 | Pipe Spacers | Jan. 8, 1974 |
| 3,791,416 | Spacer Assembly for Concentric Tubular Systems | Feb. 12, 1974 |
| 3,896,771 | Spacer and Guide Assembly for Vertical Superheater Tubes | Jul. 29, 1975 |
| 4,858,861 | Clamp Type Pipe Shoe and Method | Aug. 22, 1989 |
| 5,458,438 | Insulating Pipe Spacers | Oct. 17, 1995 |
| 5,464,179 | Two-Piece Holding Assembly Made of Plastic | Nov. 7, 1995 |
| 6,152,087 | Boiler Tube Protector and a Method for Attaching Such Protector to a Boiler Tube | Nov. 28, 2000 |
| 6,241,198 | Holding Element for Pipes and the Like | Jun. 5, 2001 |
| 6,273,030 | Spacer Bar with Tube Sleeve and Tab | Aug. 14, 2001 |
| 6,325,336 | Hydraulic Tubing Clamp | Dec. 4, 2001 |
| 6,883,761 | Support for Tubular Members | Apr. 26, 2005 |
| 7,011,277 | Antivibration Clamp for Elongated Objects | Mar. 14, 2006 |
| 7,654,587 | Mechanical Pipe Coupling Having Spacers | Feb. 2, 2010 |
| 8,281,527 | Ribbed Tube Continuous Flexible Spacer Assembly | Oct. 9, 2012 |
| 8,398,034 | Pipe Spacer | Mar. 19, 2013 |
| 2006/0169344 | Pipe Assembly | Aug. 3, 2006 |

BRIEF SUMMARY OF THE INVENTION

The present invention relates to improvements for tube separation assemblies currently used in oil field applications. More particularly, the present invention relates to improvements of tube assemblies for maintaining tube separation using a fastening system comprising non-metallic tube spacers and a locking mechanism on the fastening system.

The present invention provides a tube support apparatus for spacing and fastening cylindrical tubes in a multiple tube assembly.

The apparatus employs a frame which can be a channel having one or more flanges.

Polymeric blocks are attached to the frame at spaced apart positions including upper and lower blocks.

A plurality of elongated transverse members are mounted to the frame, a plurality of projections extending from each transverse member.

Each projection has an enlarged end portion.

Tubes or tubing to be supported are placed in between two posts and in between two of the blocks. The tubes or tubing sections are each cylindrically shaped in cross section. Such tubing is known and commercially available, provided in external diameters of between ¼" and 1" inches.

The spacing between the enlarged end portions is smaller than the tube outer diameter.

In one embodiment, the polymeric blocks are blocks of acetal copolymer resin.

In another embodiment, the spacer may comprise nylon resin polymer.

In a preferred embodiment, the spacer may comprise acetal homopolymer, wherein the acetal homopolymer is stabilized with ultraviolet light.

In one embodiment, the enlarged end portions are rounded.

In one embodiment, each polymeric block has a generally triangularly shaped cross section.

In one embodiment, the elongated transverse members are plates having one or more flat surfaces.

In one embodiment, the plate is in between the frame and said block.

In one embodiment, each said plate engages a lower block.

The present invention provides an apparatus for supporting multiple spaced apart tubes.

The apparatus includes a frame and a plurality of spaced apart lower members attached to the frame.

In one embodiment, there are a plurality of spaced apart upper members, each upper member connected to a lower member.

The cross-sectional diameter of the upper member may be greater than the cross-sectional diameter of the lower member and the vertical length of the lower member may be greater than the vertical length of the upper member.

In one embodiment, the polymeric blocks (delta bars or round bar rods) are blocks of acetal copolymer.

In an embodiment the spacers are made of an acetal homopolymer, and the acetal homopolymer is stabilized with ultraviolet light.

In one embodiment, enlarged end portions are rounded.

In one embodiment, each polymeric block has a generally triangularly shaped cross section.

In one embodiment, the elongated transverse members are plates having one or more flat surfaces.

In one embodiment, the plate is in between the frame and said block.

In one embodiment, each plate engages a lower block.

The present invention comprises a method of supporting a plurality of tubing sections.

The method includes providing an elongated frame and attaching inner blocks to the frame at spaced apart intervals.

The method includes attaching a plurality of posts to the frame at spaced apart intervals, each post having an enlarged section.

The method includes placing a tubing section between two said posts in a first location and between two said posts in a second location.

The posts are deflected so that the tubing section fits in between the posts and in between the enlarged portions and an inner block.

An outer block is affixed to each inner block with one or more fasteners. The tubing outer diameter is greater than the spacing between the enlarged portions.

In an embodiment of the method of the present invention:
A) All spacers are manufactured using a series of injection molds to form the parts, using a suitable resin, for example an acetal copolymer or acetal homopolymer (for example acetal homoplymer DELRIN® 527UV (DELRIN® is a registered trademark of DU PONT DE NEMOURS AND COMPANY));
B) Thermoplastic retainers are supplied in 1"×8 ft. rods. The rods are split down the middle to form two half round×1" wide retainers. The rods are cut to length to fit channel to be installed. Hardware access holes are drilled at locations on the rod to fit channel. In the case of a "Delta Bar", one extra step is taken to change geometry from round to delta shape by shaving edges of the round bar.
C) Flat bar is manufactured from ¼" thick×1" wide×12 ft. long stainless steel grade 316. Grade SS304 and aluminum 6000 series may also be specified. Flat bars are cut to a dimension that will match the top thermoplastic retainer. Holes are drilled to also match top retainer and bottom thermoplastic retainer. All sharp edges are removed, along with burrs and cutting oils.

In an embodiment of the method of the present invention, assembly of a tube spacing apparatus comprises the following steps:
(a) join flat bar to the top thermoplastic retainer bar using double coated polyethylene double sided foam tape;
(b) join tube spacer and bottom plate to the bottom retainer thermoplastic bar using polyethylene tape;
(c) a strip of tape may also be added to the bottom of the spacer plate to allow to adhere to the channel;
(d) supply all necessary hardware to match the number of access holes used;
(e) top and bottom retainer along with hardware are placed in cartons and ready for shipment.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-13 show a preferred embodiment of the apparatus of the present invention designated generally by the numeral 10. Tubing spacer apparatus 10 employs a frame 11 that can be a channel or channel shaped member as shown in FIGS. 5 and 6. The channel or frame 11 can provide a web 12 and spaced apart flanges 13, 14. The frame 11 has an interior 15 in between flanges 13, 14. Frame 11 can be of any suitable structural material such as fiberglass, steel, stainless steel or aluminum.

Interior 15 carries a plurality of spaced apart bottom or lower retainers 16. The retainers 16 are secured to web 12 of frame 11. Plates 17 having tube spacer posts 19 can be mounted to frame 11. In one embodiment, the plates 17 with spacer posts 19 is mounted to web 12. The details of the plate 17 and tube spacer post 19 can be seen in FIGS. 9-11. Web 12 has web inner surface 18. Plates 17 fit against web inner surface 18 as seen in FIGS. 4-5 and 14.

Fasteners such as bolted connections can be used to secure the upper and lower retainers to the frame 11. Such bolted connections typically include a bolt 25, nut 26 and one or more washers. In order to fasten the retainers (or retaining blocks) 16, 23 to the frame 11, openings are provided in the thermoplastic blocks 29 and plates 24 that are a part of the retainers 16, 23. The plate 17 and its tube spacer posts 19 can be clamped to the surface 18 of web 12 in between the plate 24 of lower retainer 16 and web 12. In order to accept bolts 25, both the plates 24 and thermoplastic blocks 129 have bolt receptive openings. Flat washer 37 may be between bolt 25 and a plate 24. Each block has openings 27, 28 (see FIG. 1). Each plate 24 has openings 31, 32 (see FIG. 4).

Figure 8:
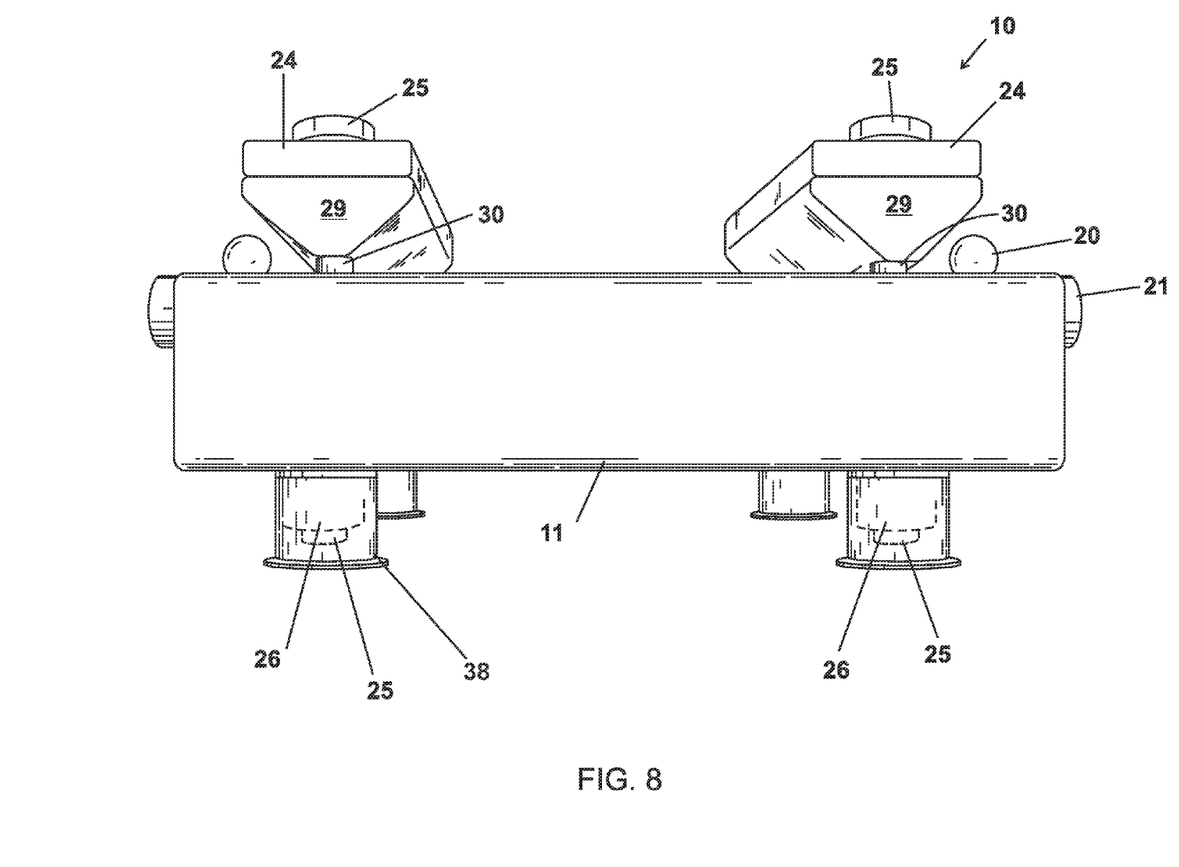
FIG. 8 is a side view of a preferred embodiment of the apparatus of the present invention.

Caps 38 shown in FIGS. 5 and 8 are not part of the invention and are only used on samples to prevent marring of table surfaces by bolt 25.

Double sided foam tape, for example polyethylene double coated foam tape, may be between plates 24 and blocks 29 as part of the assembly. Foam tape may also be between lower retainer 16 and plate 17, and between plate 17 and frame or channel 11.

Figures 9, 11:
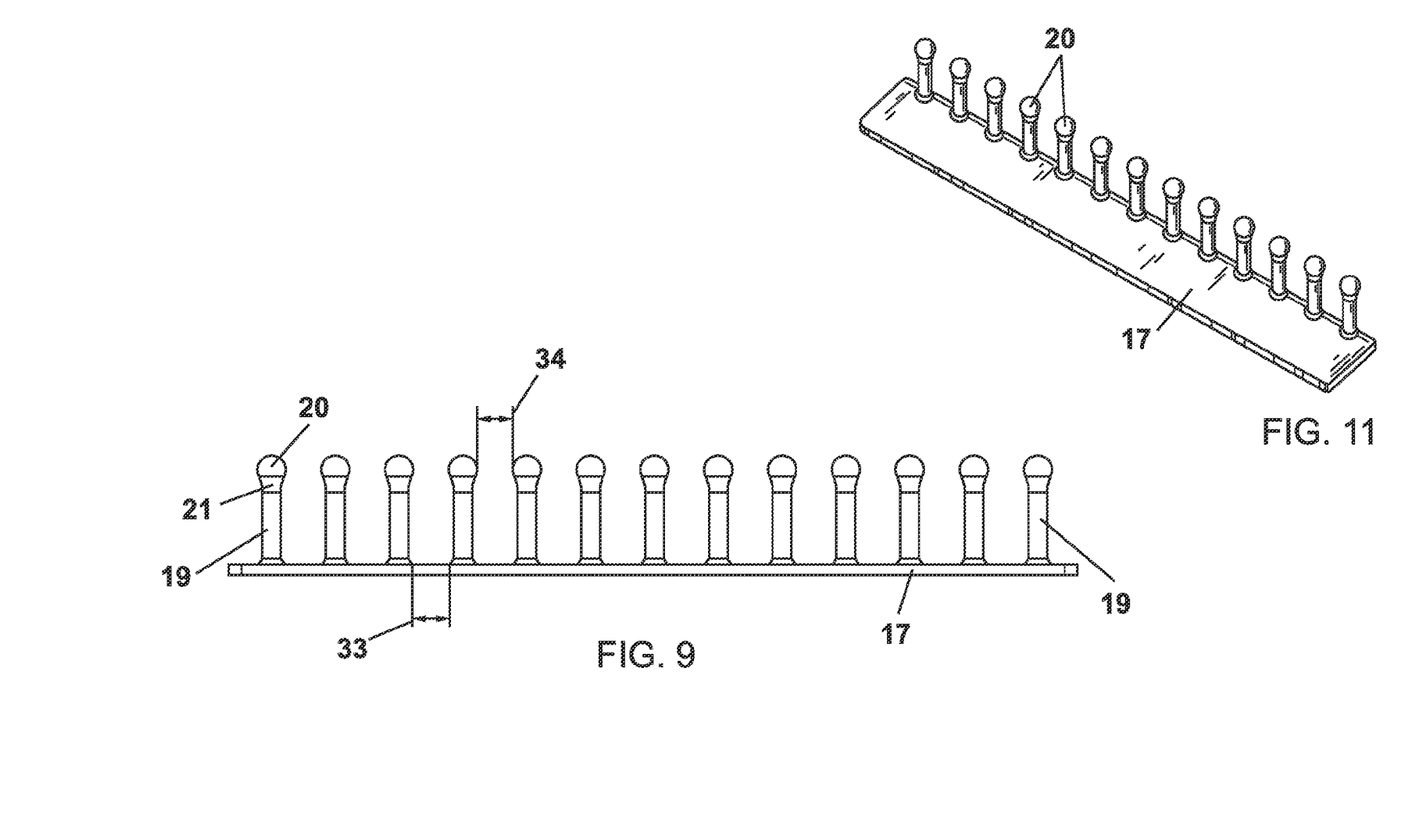
FIG. 9 is a detailed view of the plate with tube spacer posts.
FIG. 11 is a detailed view of the plate with tube spacer posts.
Figure 10:
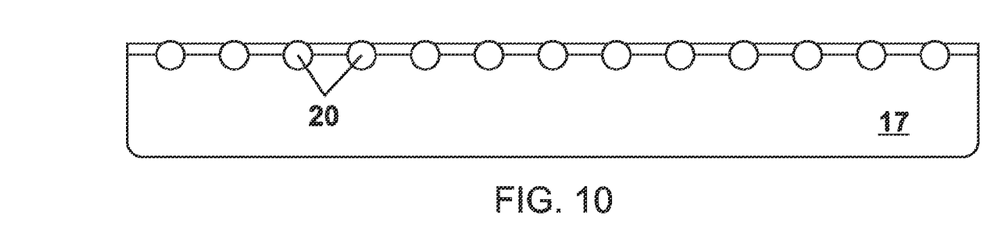
FIG. 10 is a detailed view of the plate with tube spacer posts.
Figure 12:
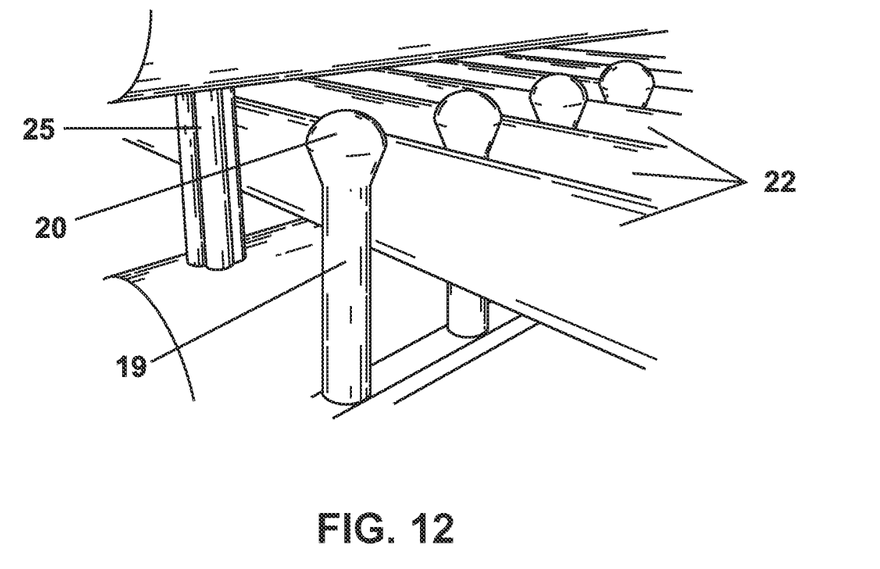
FIG. 12 is a partial perspective view of an embodiment of the apparatus of the present invention.
Figure 13:
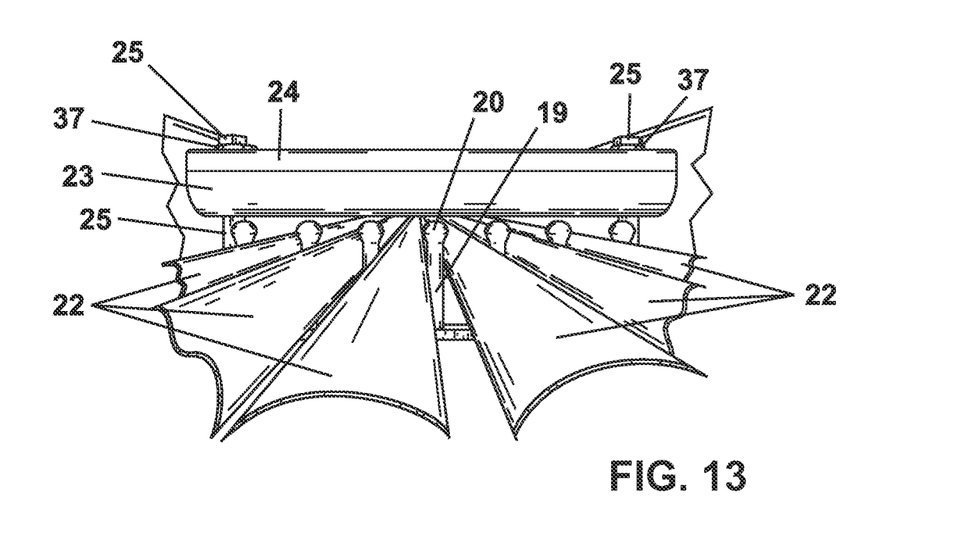
FIG. 13 is a partial end view of an embodiment of the apparatus of the present invention.

Each tube spacer post 19 (FIGS. 9-11) has an enlarged diameter portion 20 such as a spherically shaped or rounded enlarged end 20. In one embodiment, a frusto-conical transition section 21 can join spherical end 20 to tube spacer post 19 as seen in FIGS. 10-11.

Figure 1:
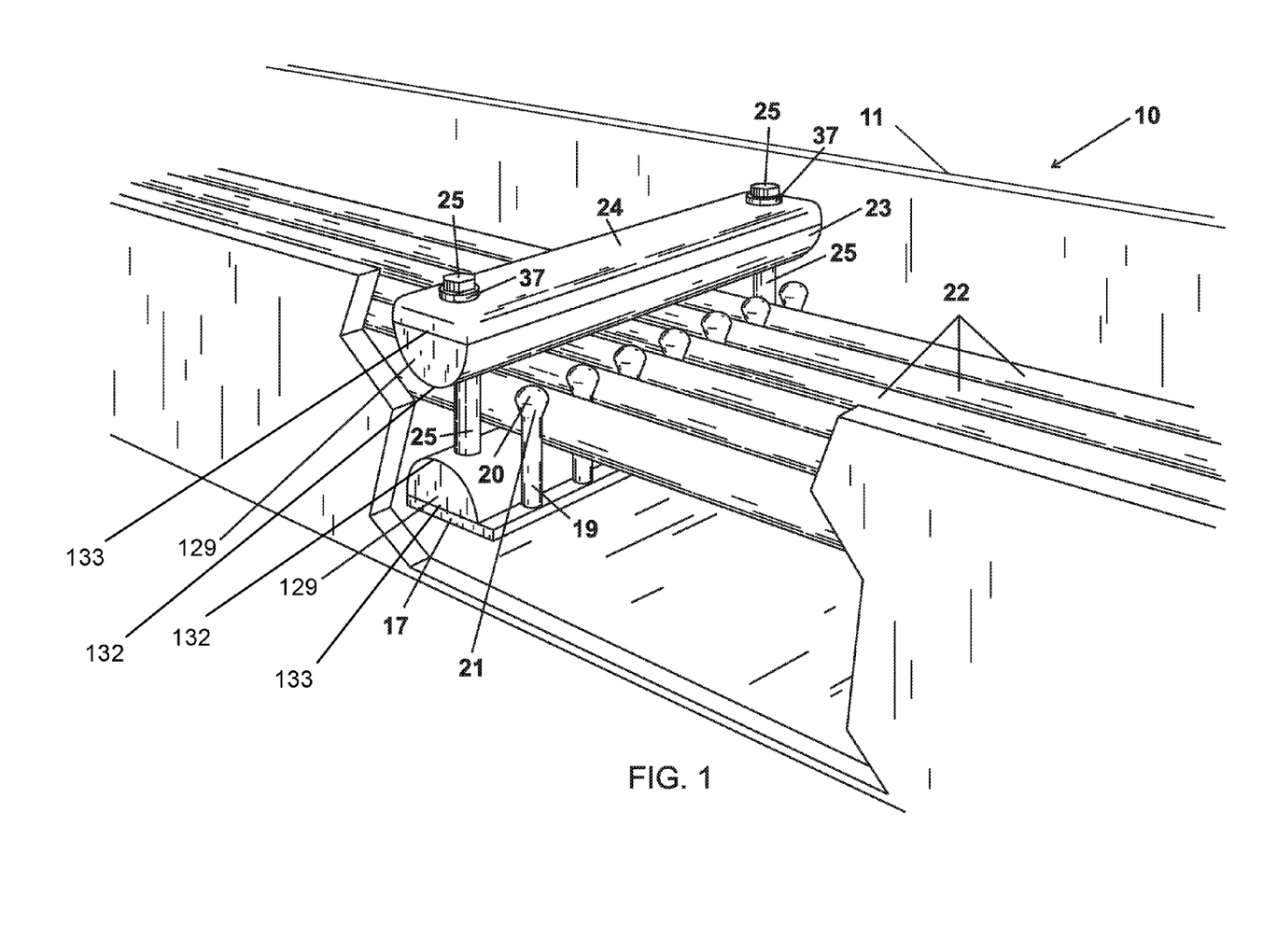
FIG. 1 shows an embodiment of the present invention.
Figure 2:
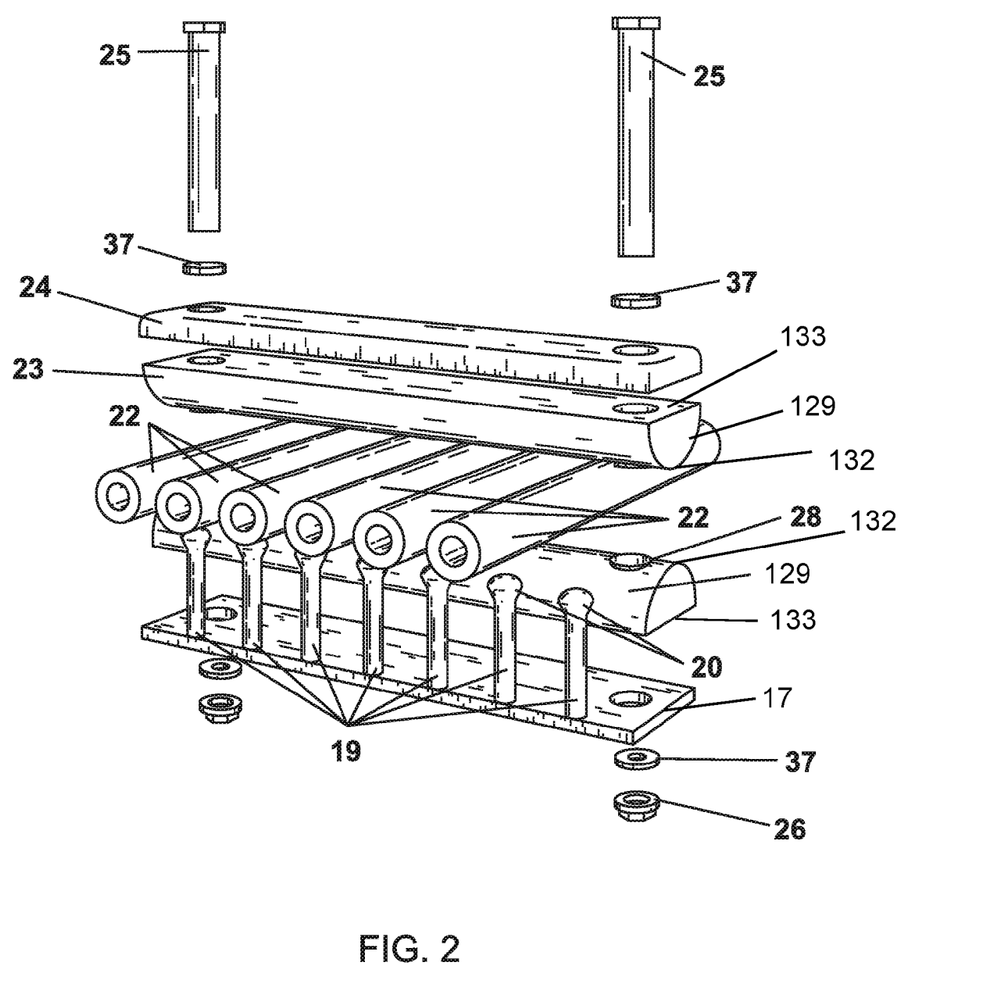
FIG. 2 shows an expanded view of an embodiment of the present invention.

As can be seen in FIG. 1, lower block 129 is placed directly on top of lower elongated transverse member or plate 17. As can be seen in FIG. 2, for example, each post 19 has a cylindrical portion and an enlarged end portion 20.

Figure 3:
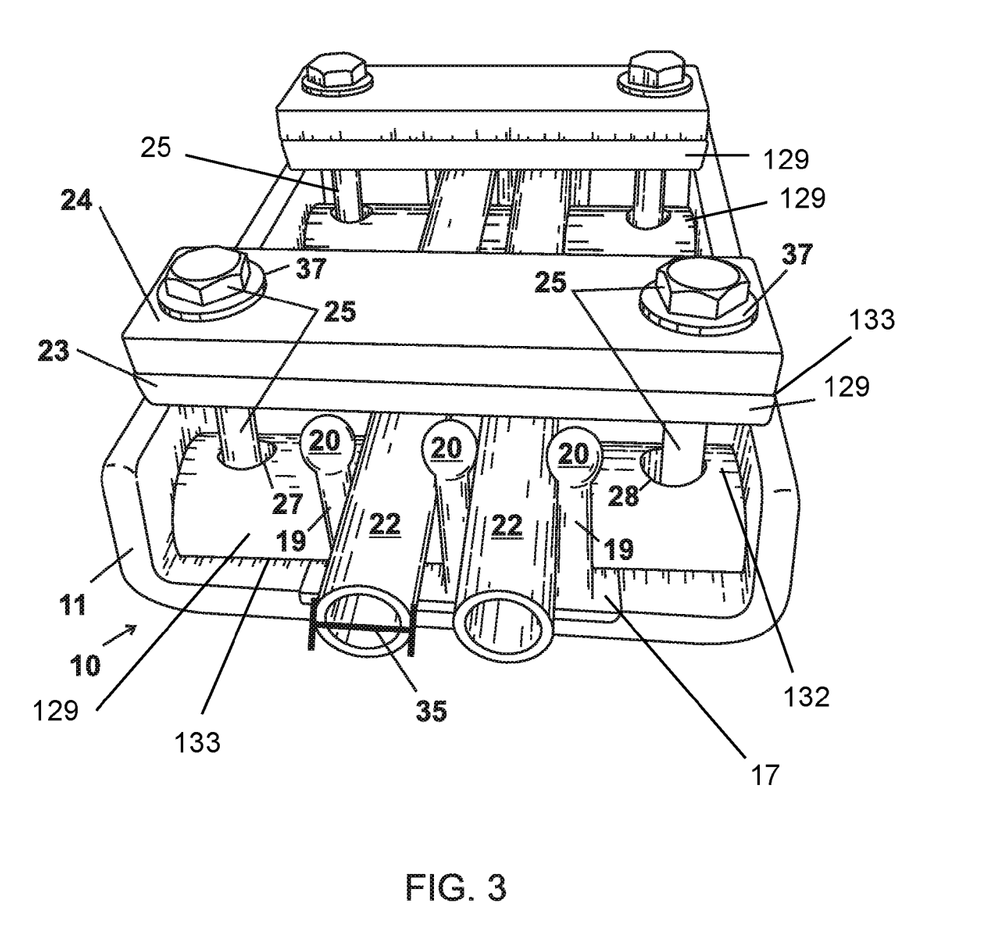
FIG. 3 shows an embodiment of the present invention.
Figure 4:
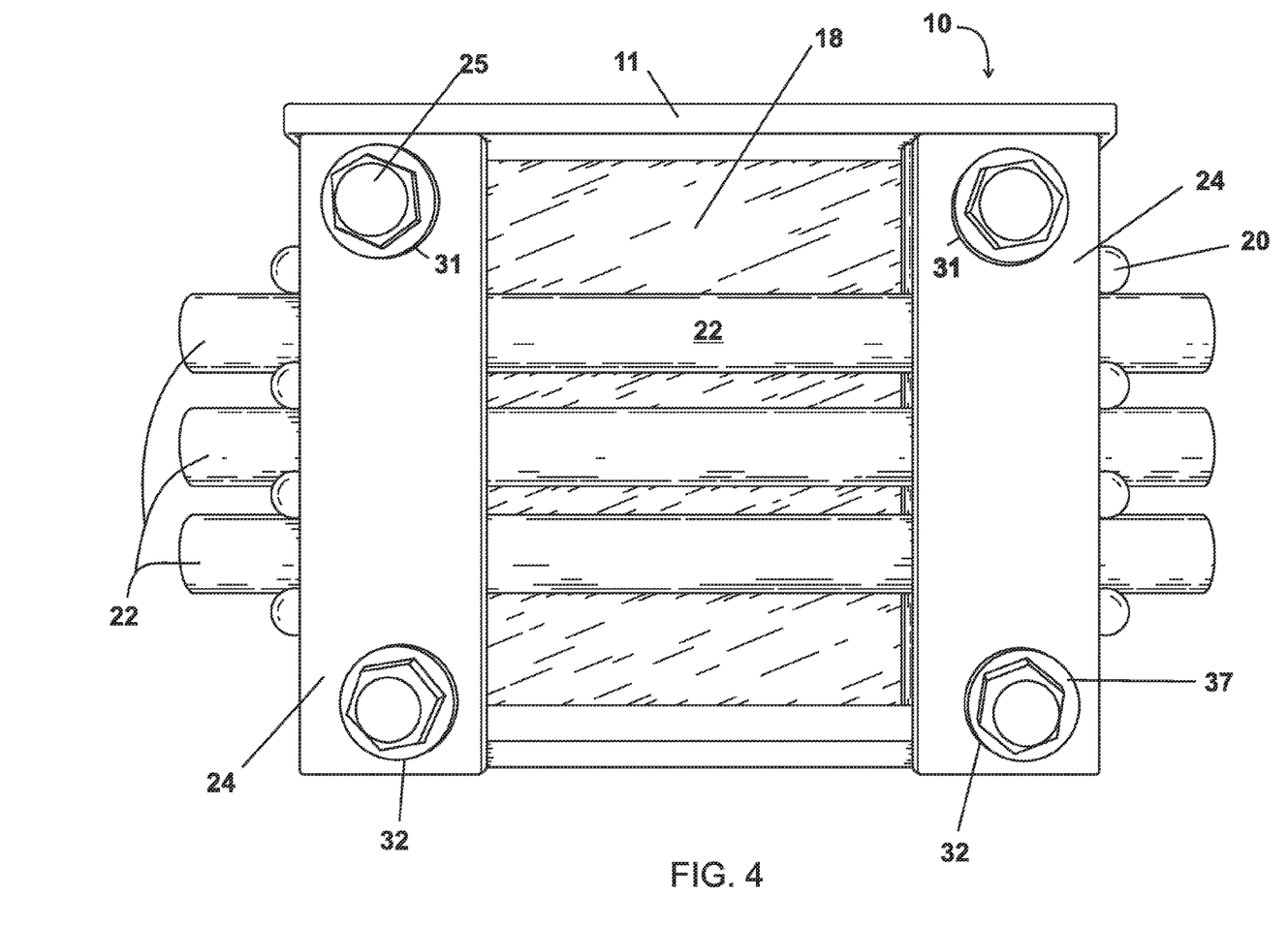
FIG. 4 is a top plan view of a preferred embodiment of the apparatus of the present invention.
Figure 5:
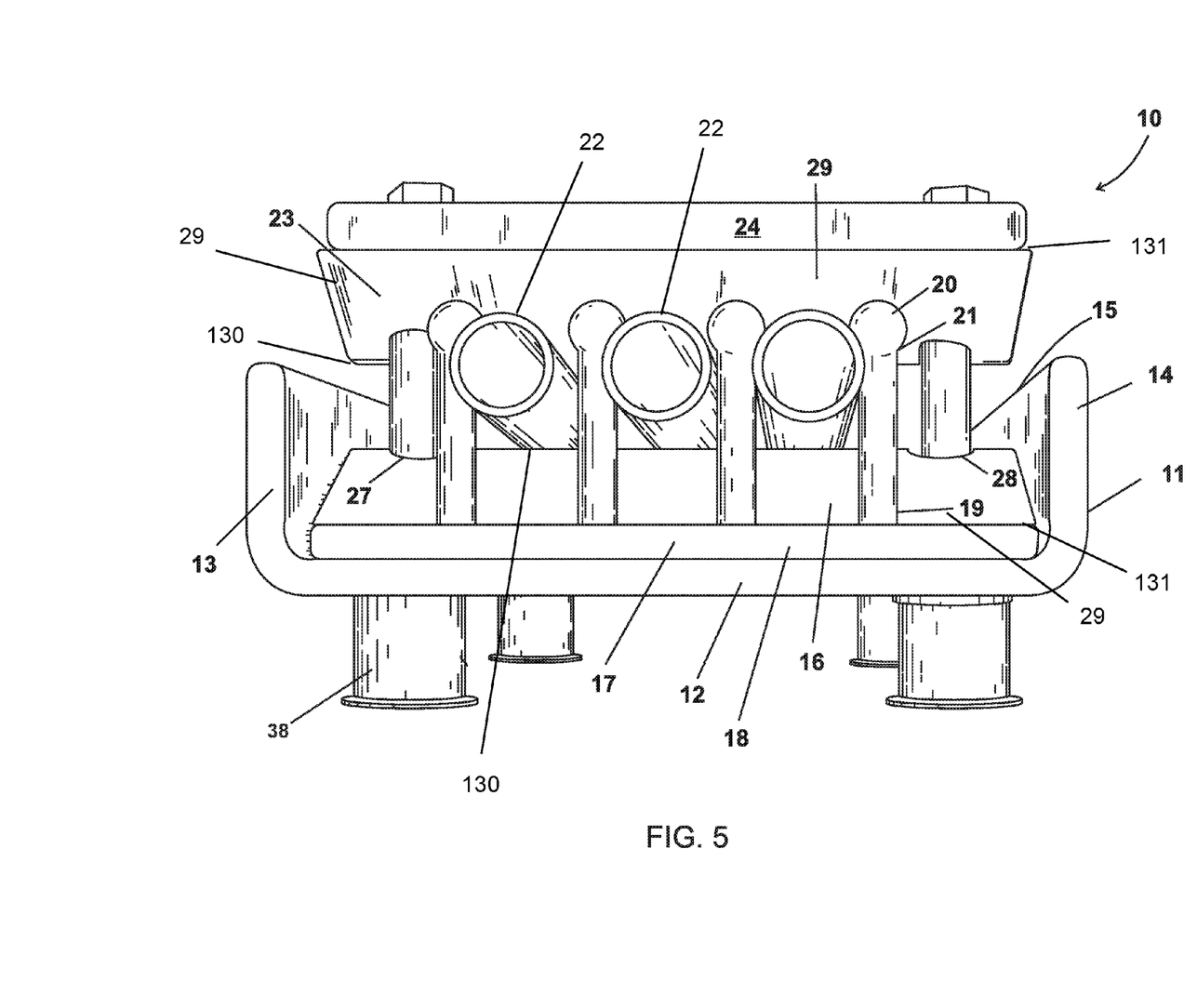
FIG. 5 is a partial end view of a preferred embodiment of the apparatus of the present invention.
Figure 6:
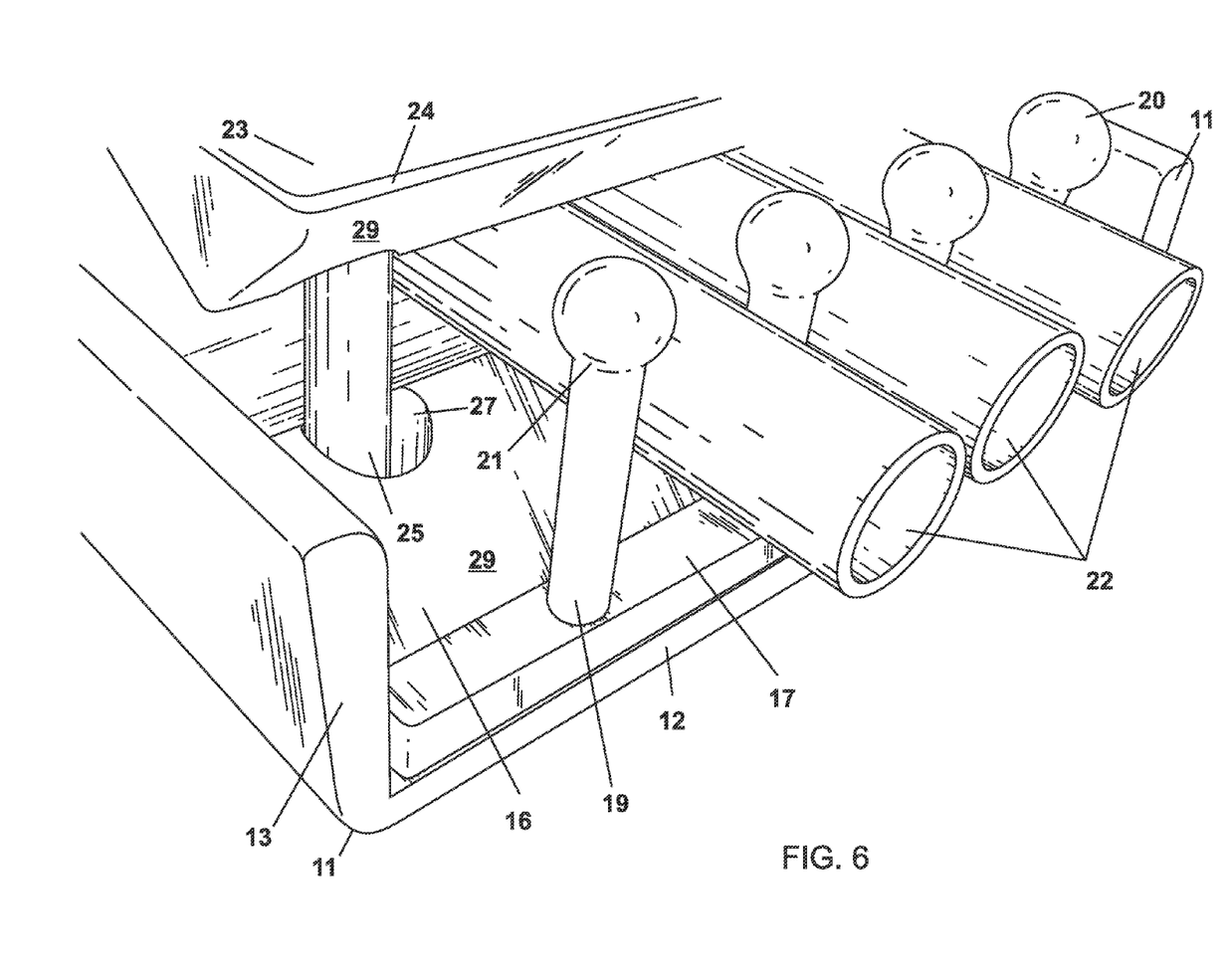
FIG. 6 is a partial perspective view of a preferred embodiment of the apparatus of the present invention.
Figure 7:
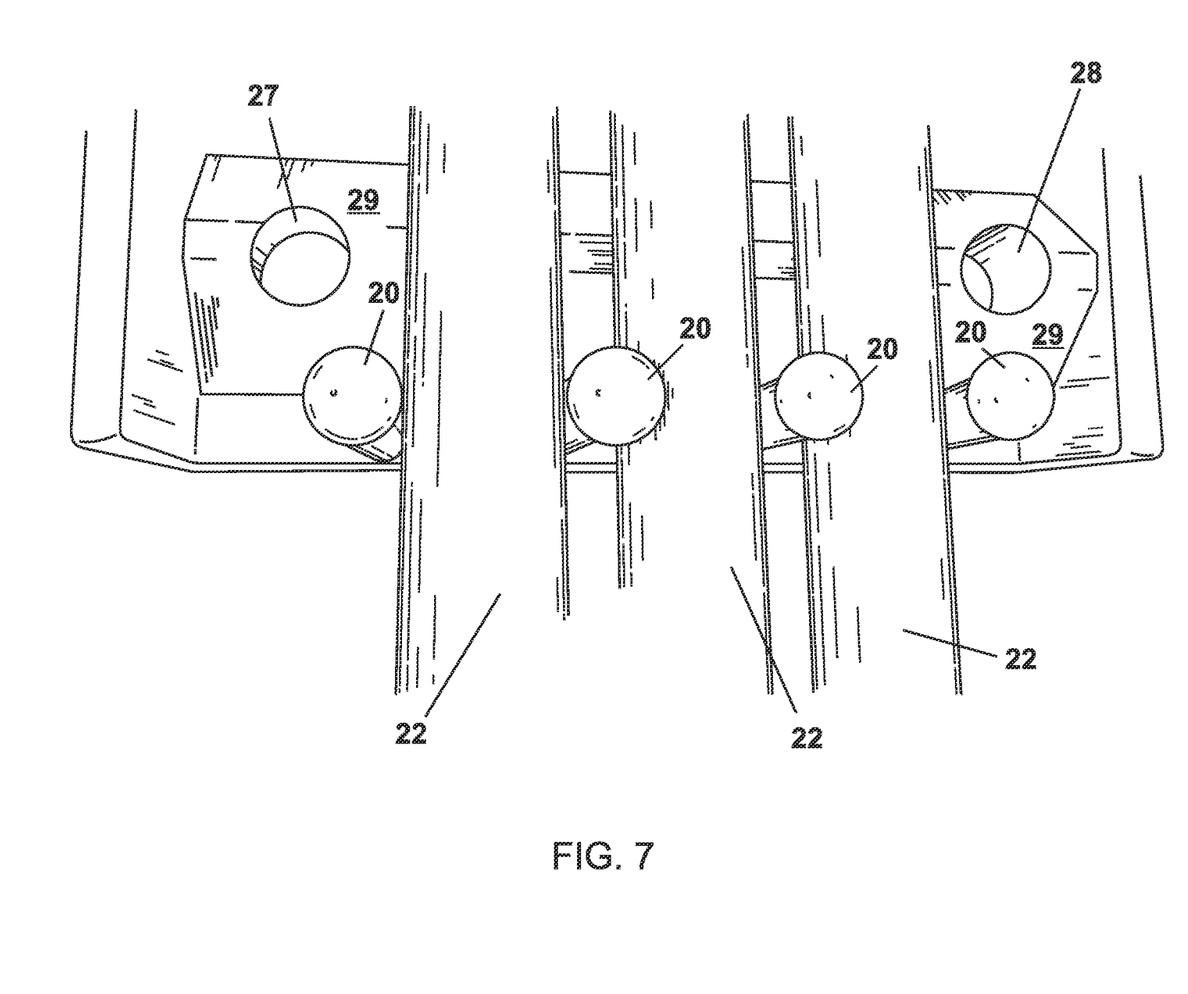
FIG. 7 is another partial perspective view of a preferred embodiment of the apparatus of the present invention.

The apparatus 10 of the present invention is designed to support a plurality of cylindrically shaped tubes 22 (or sections of tubing) as seen in FIGS. 1-8. Such tubes or tubing sections 22 are known and commercially available in sizes (outer diameter) of between ¼" and 1" inches. A plurality of bottom retainers 16 are spaced along web 12. A plurality of upper retainers 23 are connected to the frame 11 and to bottom retainers 16 with bolted connections such as bolts 25 and nuts 26. Each retainer 16, 23 can include a metal plate 24 and thermoplastic triangularly shaped block or member 29 (as shown in FIGS. 5-8 and 11) or thermoplastic semi-circularly shaped block or member 129 (as shown in FIGS. 1-3). The blocks or members 29 are triangularly shaped in cross section or in end view as seen for example in FIG. 8. Each block or member 29 provides a surface or edge 30 which engages the tubes 22 as seen for example in FIGS. 5 and 8. In order to assemble a plurality of tubes or tubing sections 22 to frame 11, the frame 11 is fastened to or mounted upon a desired surface such as a wall. The frame or channel 11 may be supported by steel angle iron welded to steel support structures, beams, columns, or walls.

Plates 17 with posts 19 are affixed to frame 11 at web 12. The posts 19 have a spacing that provides clearance at 33 (see FIGS. 9-11) on plate 17 that is sufficient to allow placement of each tube or tubing section between two of the posts 17. Because there are multiple posts 17, several tubing sections 22 can be mounted side by side. Enlarged ends 20 are spaced apart to provide a clearance distance 34 (see FIGS. 9-11) that is smaller than the outer diameter 35 of tube 22. Thus, the enlarged ends 20 of two adjacent posts 19 must be deflected laterally so that the tube 22 can fit in between two of the posts behind the enlarged ends 20 at a position in between plate 17 and enlarged end positions 20. Because the posts 19 are of a flexing material, they bend to enable tube 22 to push the enlarged ends 20 of two adjacent posts 19 apart. In this fashion, multiple tubes 22 can be supported, with the number of tubes that may be supported being restricted only by the diameter of channel or frame 11.

Plates 17 with posts 19 are positioned at intervals along frame 11 (such as between about 8 inches and 3 feet apart).

Bolts 25 and nuts 26 fasten together the assembly of frame, plate 17 with posts 19, lower retainer 16 (plate 24 and block 29) upper retainer (plate 24 and block 29). The edge 30 of block 29 engages or abuts the tubes 22. By tightening the bolts/nuts 25, 26, a clamping grip is made upon the tubes 22 by the retainers 16, 23.

Blocks 29 are preferably of a thermoplastic material. Plate 17, posts 19 and enlarged ends 20 can be a one piece injection molded part of any injection moldable material such as delrin, nylon or polyvinyl chloride, as examples. Plates 24 can be metallic such as stainless steel.

The present invention includes a tube support apparatus (see FIG. 2) comprising:

a multiple tube assembly having a plurality of tubes 22, each of the plurality of tubes 22 being a cylindrical tube and having a cylindrical wall surrounding a bore and having an outer diameter 35 (see FIG. 3);

retaining blocks 129 (FIG. 1-3) or 29 (as shown in FIGS. 8 and 11) at spaced apart positions (see FIGS. 3 and 4), the retaining blocks 29, 129 including at least a first block 29, 129, a second block 29, 129, a block 29, 129, and a fourth block 29, 129, each block having a base 131, 133 and an apex 130, 132 distal from the base 131, 133 (as perhaps best seen in FIG. 2);

a plurality of elongated transverse members 17, the base 131, 133 of the third block 29, 129 placed directly on top of a first corresponding elongated transverse member 17 (see FIG. 2) and the base of the fourth block 29, 129 placed directly on top of a second corresponding elongated transverse member 17;

a plurality of projections 19 extending directly from each elongated transverse member 17;

each projection 19 having a cylindrical portion, an enlarged end portion 20, and a height, and wherein a spacing is between every two immediately adjacent enlarged end portions 20 of the plurality of projections 19 extending directly from each elongated transverse member 17;

each of said plurality of tubes 22 placed between two of said plurality of projections 19;

each of said plurality of tubes 22 placed between the first block 29, 129 and the third block 29, 129 and between the second block 29, 129 and the fourth block 29, 129, each of the tubes 22 contacting the blocks only at the apex 130, 132 of the blocks 29, 129 (see FIG. 1);

wherein the spacing between every two immediately adjacent enlarged end portions 20 is smaller than the outer diameter 35 of each of said plurality of tubes 22 as seen in FIG. 3; and wherein the height of each projection is greater than the outer diameter 35 (see FIG. 3) of each of said plurality of tubes 22 as seen in FIGS. 1 and 3.

Attached to my U.S. Provisional Patent Application Ser. No. 61/878,222, filed Sep. 16, 2013, and incorporated herein by reference is a brochure with more information about the present invention.

As can be seen in FIG. 1, there is an upper block 129 and a lower block 129. Element 132, referred to as the apex of lower block 129, might instead be called the lowermost end of block 129 distal from base 133 when block 129 is mounted upside down, as is the upper block 129 in FIG. 1, and the uppermost end of block 129 distal from base 133 when block 129 is mounted right side up, as is the lower block 129 in FIG. 1, or simply the end of block 129 distal from base 133.

Likewise, as can be seen in FIG. 5, there is an upper block 29 and a lower block 29. Element 130, referred to as the apex of lower block 29, might instead be called the lowermost end of block 29 distal from base 131 when block 29 is mounted upside down, as is the upper block 29 in FIG. 5, and the uppermost end of block 29 distal from base 131 when block 29 is mounted right side up, as is the lower block 29 in FIG. 5, or simply the end of block 29 distal from base 131.

The following is a list of parts and materials suitable for use in the present invention.

PARTS LIST

PART NUMBER DESCRIPTION
10 tubing spacer apparatus
11 frame/channel
12 web
13 flange
14 flange
15 interior
16 lower retainer/spacer assembly
17 plate
18 web inner surface
19 tube spacer post
20 spherical end/enlarged diameter portion
21 frusto-conical transition section
22 tube/tubing section
23 upper retainer
24 plate (preferably stainless steel)
25 bolt
26 nut
27 opening
28 opening
29 thermoplastic triangular block/member
30 edge
31 plate opening
32 plate opening
33 clearance distance
34 clearance distance
35 outer diameter 37 flat washer
38 cap
129 thermoplastic semi-circular block/member
130 apex of block 29
131 base of block 29
132 apex of block 129
133 base of block 129

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A tube support apparatus, comprising:
a plurality of tubes, each of the plurality of tubes being a cylindrical tube, having a cylindrical wall surrounding a bore, and having an outer diameter;
a first tube support assembly, and a second tube support assembly spaced apart from the first tube support assembly, each of the first and second tube support assemblies comprising:
a plurality of retaining blocks at spaced apart positions, the retaining blocks including at least an upper block and a lower block, the upper block having a base and a lowermost end distal from the base of the upper block, and the lower block having a base and an apex distal from the base of the lower block;
a plurality of elongated transverse members, the elongated transverse members including at least an upper elongated transverse member and a lower elongated transverse member, the upper elongated transverse member placed directly above the base of the upper block, the base of the lower block placed directly above the lower elongated transverse member;
a plurality of projections, the projections extending directly from the lower elongated transverse member, each projection having a cylindrical portion, an enlarged end portion, and a height, and wherein a spacing is between every two immediately adjacent enlarged end portions of the plurality of projections;
each of the plurality of tubes placed between two of said plurality of projections;
each of the plurality of tubes sandwiched between the upper block and the lower block, each of the plurality of tubes contacting the upper block only at the lowermost end of the upper block, each of the plurality of tubes contacting the lower block only at the apex of the lower block;
wherein the spacing between every two immediately adjacent enlarged end portions is smaller than the outer diameter of each of said plurality of tubes; and
wherein the height of each projection is greater than the outer diameter of each of said plurality of tubes.

2. The tube support apparatus of claim 1, wherein the retaining blocks of each tube support assembly comprise a polymeric material.

3. The tube support apparatus of claim 1, wherein the plurality of projections of each tube support assembly is made of a resin material.

4. The tube support apparatus of claim 1, wherein said enlarged end portions of each tube support assembly are rounded.

5. The tube support apparatus of claim 1, wherein the elongated transverse members of each tube support assembly are plates having one or more flat surfaces.

6. The tube support apparatus of claim 1, wherein the outer diameter of each of the plurality of tubes is between ¼" and 1".

7. The tube support apparatus of claim 1, wherein each of said retaining blocks of each tube support assembly has a generally triangularly shaped cross section in an end view thereof.

8. The tube support apparatus of claim 1, wherein each of said retaining blocks of each tube support assembly has a generally semi-circular shaped cross section in an end view thereof.

9. A tubing support apparatus comprising:
a plurality of polymeric retaining blocks, the polymeric retaining blocks including a first polymeric retaining block and a second polymeric retaining block positioned in vicinity of the first polymeric retaining block, the first polymeric retaining block having a base and a lowermost end distal from the base of the first polymeric retaining block, the second polymeric retaining block having a base and an apex distal from the base of the second polymeric retaining block;
a plurality of spaced apart transverse members, the spaced apart transverse members including a first transverse member and a second transverse member, the first transverse member placed in direct contact with the base of the first polymeric retaining block, the second transverse member placed in direct contact with the base of the second polymeric retaining block;
a plurality of posts extending directly from the second transverse member, each post having a cylindrical portion and an enlarged end portion spaced away from the second transverse member, the enlarged end portions of every two immediately adjacent posts of the plurality of posts being spaced apart from one another at a spacing distance;
a plurality of tubing sections, each tubing section positioned between the posts and having an outer diameter, each tubing section being sandwiched between the first polymeric retaining block and the second polymeric retaining block, the spacing distance between the enlarged end portions of every two immediately adjacent posts of the plurality of posts being smaller than the outer diameter of each tubing section; and
fasteners securing the first polymeric retaining block and the second polymeric retaining block to the tubing sections, the tubing sections contacting the first polymeric retaining block only at the lowermost end of the first polymeric retaining block, the tubing sections contacting the second polymeric retaining block only at the apex of the second polymeric retaining block.

10. The tubing support apparatus of claim 9, wherein the posts are made of a resin material.

11. The tubing support apparatus of claim 10, wherein the resin material is an ultraviolet light stabilized homopolymer resin material.

12. The tubing support apparatus of claim 9, wherein said enlarged end portions are rounded.

13. The tubing support apparatus of claim 9, wherein the outer diameter of each of the plurality of tubing sections is between ¼" and 1".

14. The tubing support apparatus of claim 9, wherein each of said polymeric retaining blocks has a generally triangularly shaped cross section in an end view thereof.

15. The tubing support apparatus of claim 9, wherein each of said polymeric retaining blocks has a generally semi-circular shaped cross section in an end view thereof.

* * * * *